United States Patent
Nagashima et al.

(10) Patent No.: US 9,158,429 B2
(45) Date of Patent: Oct. 13, 2015

(54) ROTARY INPUT DEVICE AND ELECTRONIC EQUIPMENT

(75) Inventors: Kenji Nagashima, Daito (JP); Kazuhiro Takahashi, Daito (JP); Takahiko Suzuki, Okaya (JP); Takeshi Kodaira, Okaya (JP)

(73) Assignee: Fukoku Co., Ltd., Ageo-shi (JP)

( * ) Notice: Subject to any disclaimer, the term of this patent is extended or adjusted under 35 U.S.C. 154(b) by 414 days.

(21) Appl. No.: 12/764,658

(22) Filed: Apr. 21, 2010

(65) Prior Publication Data

US 2010/0271342 A1 Oct. 28, 2010

(30) Foreign Application Priority Data

Apr. 22, 2009 (JP) ................................. 2009-104064

(51) Int. Cl.
*G06F 3/0362* (2013.01)
*G06F 3/0481* (2013.01)
*G06F 3/01* (2006.01)

(52) U.S. Cl.
CPC .............. *G06F 3/0481* (2013.01); *G06F 3/016* (2013.01); *G06F 3/0362* (2013.01)

(58) Field of Classification Search
CPC ...... G06F 3/0362; G06F 3/016; G06F 3/0338
USPC ................................................ 345/156–184
See application file for complete search history.

(56) References Cited

U.S. PATENT DOCUMENTS

| 5,189,355 A | * | 2/1993 | Larkins et al. ................. 318/685 |
| 5,841,428 A | * | 11/1998 | Jaeger et al. ................... 345/184 |
| 2002/0030665 A1 | * | 3/2002 | Ano ................................. 345/168 |
| 2004/0052016 A1 | * | 3/2004 | Takagi et al. .................... 361/51 |
| 2008/0055241 A1 | | 3/2008 | Goldenberg et al. | 
| 2009/0167508 A1 | * | 7/2009 | Fadell et al. ................ 340/407.2 |

FOREIGN PATENT DOCUMENTS

JP 2003-345499 A 12/2003

OTHER PUBLICATIONS

Extended European Search Report dated Apr. 4, 2011 (seven (7) pages).

* cited by examiner

*Primary Examiner* — Kumar Patel
*Assistant Examiner* — Mansour M Said
(74) *Attorney, Agent, or Firm* — Crowell & Moring LLP

(57) ABSTRACT

Disclosed is a rotary input device, including: a rotary operation device; a rotation detecting section; a rotation driving section; a display control section to scroll an image under display by rotation of the rotary operation device; a judging section to judge whether the detected rotation angle reaches a critical angle corresponding to an end part of a range of the displayed image or not; and a rotation controlling section to reversely rotate the rotary operation device to an initial position or a reference position when it is judged that the rotation angle reaches the critical angle and the rotary operation is released, wherein the display control section displays the image displayed on the display section at a display position corresponding to the initial position or the reference position when the rotary operation device is reversely rotated to the initial position or the reference position.

8 Claims, 8 Drawing Sheets

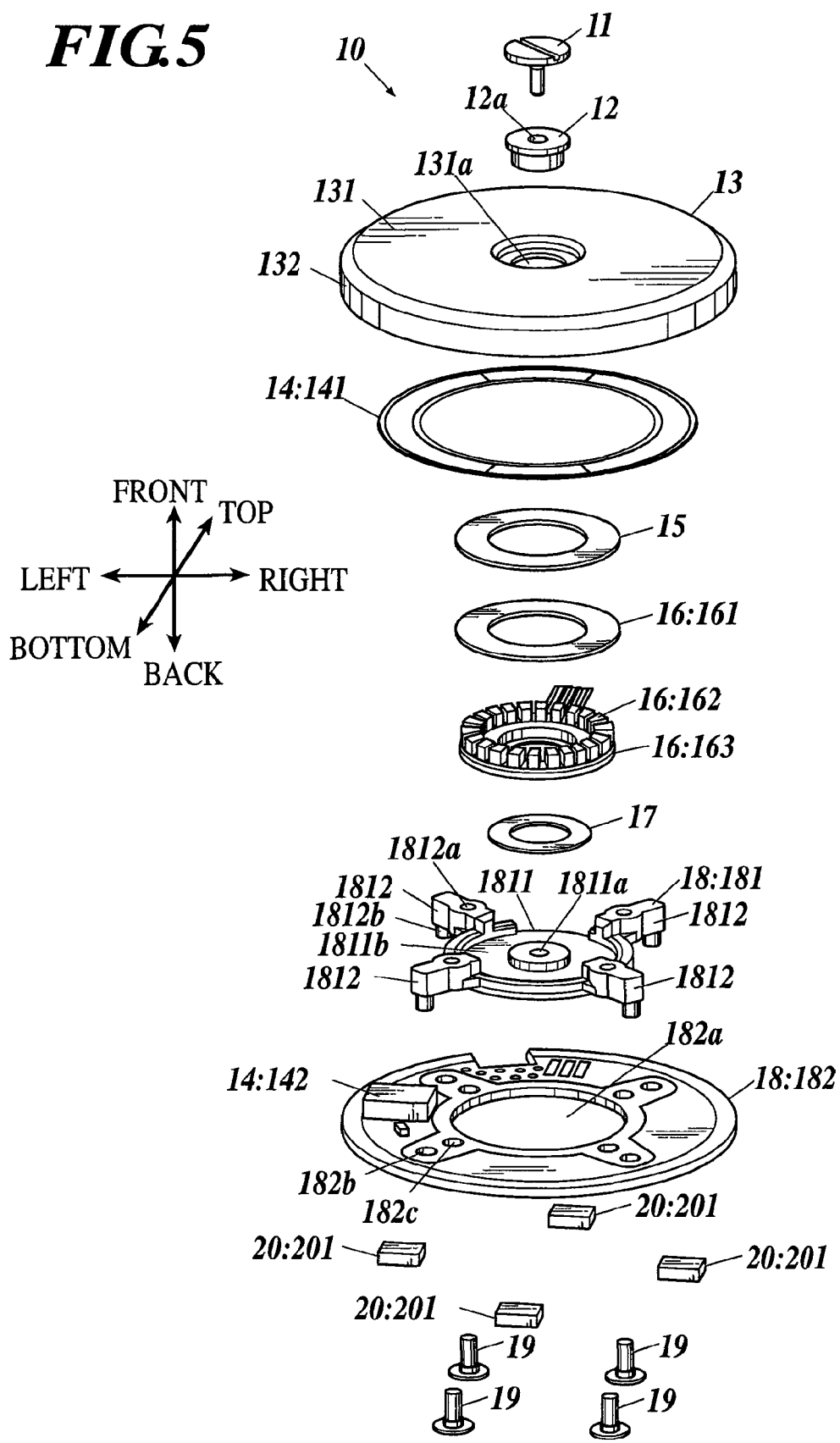

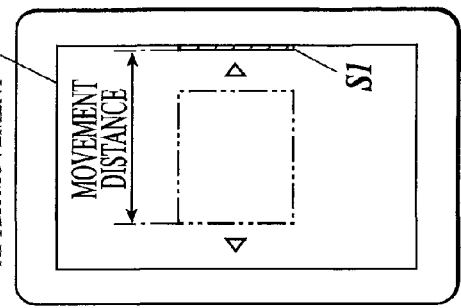
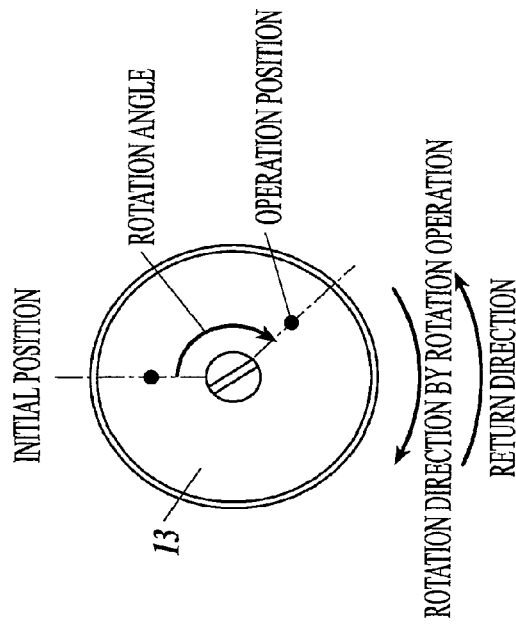
FIG.6B AFTER MOVEMENT
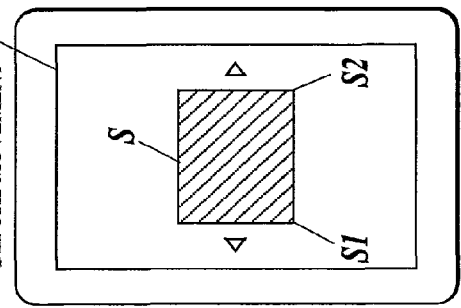
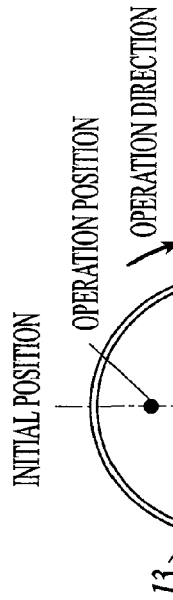
FIG.6A BEFORE MOVEMENT

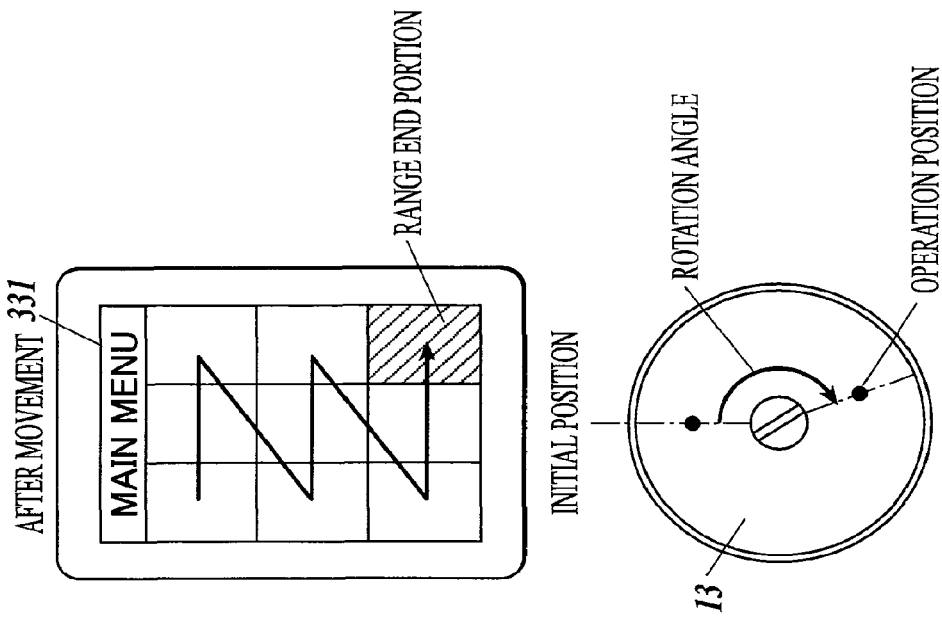
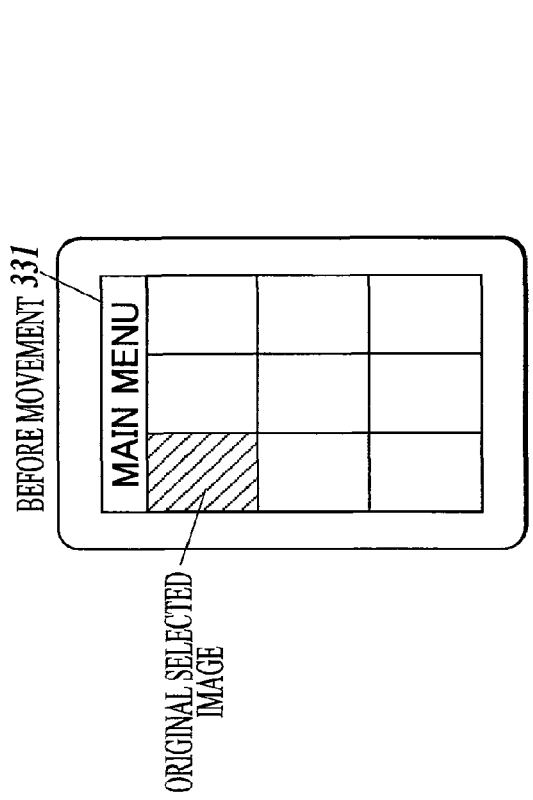
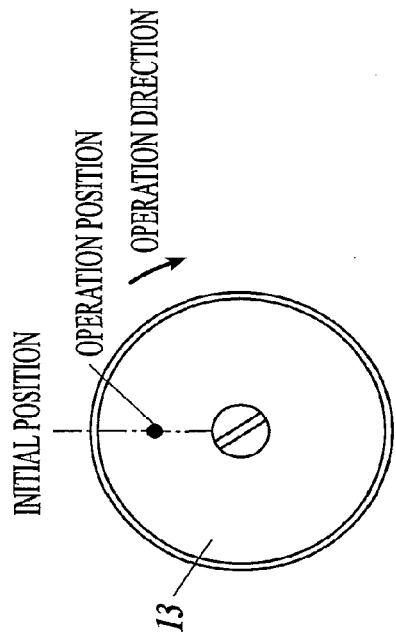

ROTARY INPUT DEVICE AND ELECTRONIC EQUIPMENT

BACKGROUND OF THE INVENTION

1. Field of the Invention

The present invention relates to a rotary input device and electronic equipment equipped with the rotary input device.

2. Description of Related Art

A rotary operation device adopted by electronic equipment, such as a portable terminal machine, audio visual (AV) equipment, and a personal computer, has hitherto been known. The rotary operation device performs an input operation into the electronic equipment by a rotary operation of a rotary operation device of the rotary input device. Such a rotary input device is configured so that selection items displayed on the display screen of the electronic equipment may be sequentially switched to be selected in conjunction with the rotation of the rotary operation device. After an operator has manually rotated the rotary operation device until an objective selection item is selected, the operator performs an operation for fixing the selection thereof, and thereby an instruction corresponding to the selected selection item is input.

Because each selection item on the screen is switched to be selected only by performing a simple rotary operation of the rotary operation device in such a rotary input device, the rotary input device has the problem of the difficulty of grasping the selection of a selection item on the screen by a sense of a hand or a finger of an operator.

Accordingly, for example, Japanese Patent Application Laid-Open Publication No. 2003-345499 discloses a mechanism giving a user a lever operating feeling by generating an operation reaction force so as to put back an operation to a neutral position in the direction reverse to an operation direction according to a rotary operation speed of a rotation mechanism section.

Because the operation of an operation section to return to the neutral position by the rotation mechanism section and an image under display are not in conjunction with each other in the technique disclosed in Japanese Patent Application Laid-Open Publication No. 2003-345499, for example, if the operation section has returned to the neutral position in the state in which the image under display reaches an end of a range, the image under display stays as it is, and the technique has the problem of bad usability.

SUMMARY OF THE INVENTION

It is an object of the present invention to provide a rotary input device which returns a position of an image to a given position by making an operation section cooperate with a display section when an image under display reaches an end of a range during rotation operation of the operation section so as to improve an operability, and electronic equipment equipped with the rotary input device.

According to a first aspect of the invention, there is provided a rotary input device, including: a rotary operation device rotatable around an axis by receiving a rotary operation of an operator; a rotation detecting section to detect a rotation angle of the rotary operation device; a rotation driving section to apply a rotary force to the rotary operation device; a display control section to scroll an image under display on a display section by rotation of the rotary operation device; a judging section to judge whether the rotation angle of the rotary operation device detected by the rotation detecting section reaches a critical angle corresponding to an end part of a range of the image displayed on the display section or not; and a rotation controlling section to reversely rotate the rotary operation device to an initial position or a reference position when the judging section judges that the rotation angle of the rotary operation device reaches the critical angle and the rotary operation of the operator to the rotary operation device is released, wherein the display control section displays the image displayed on the display section at a display position corresponding to the initial position or the reference position when the rotary operation device is reversely rotated to the initial position or the reference position by the rotation controlling section.

According to a second aspect of the invention, there is provided a rotary input device, including: a rotary operation device rotatable around an axis by receiving a rotary operation of an operator; a rotation detecting section to detect a rotation angle of the rotary operation device; a rotation driving section to apply a rotary force to the rotary operation device; a display control section to scroll an image under display on a display section by rotation of the rotary operation device; a judging section to judge whether the rotation angle of the rotary operation device detected by the rotation detecting section reaches a critical angle corresponding to an end part of a range of the image displayed on the display section or not; a force sense presenting section to present a force sense to the operator operating the rotary operation device by applying a loaded rotary force to the rotary operation device by the rotation driving section according to the rotation angle of the rotary operation device detected by the rotation detecting section; and a rotation controlling section to reversely rotate the rotary operation device to an initial position or a reference position when the judging section judges that the rotation angle of the rotary operation device reaches the critical angle and the rotary operation of the operator to the rotary operation device is released, wherein the force sense presenting section informs the operator of impossibility of further rotation by applying rotary forces in a forward direction and a backward direction periodically to the rotary operation device by the rotation driving section when the judging section judges that the rotation angle of the rotary operation device reaches the critical angle; and the display control section displays the image displayed on the display section at a display position corresponding to the initial position or the reference position when the rotary operation device is reversely rotated to the initial position or the reference position by the rotation controlling section.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is an exploded view of the rotary input device of the present embodiment;

FIGS. 6A and 6B are views for describing the movements of an image displayed on a display section and a movement of a rotary operation device;

FIGS. 7A and 7B are views for describing an image displayed on the display section and a movement of the rotary operation device.

DETAILED DESCRIPTION OF THE PREFERRED EMBODIMENTS

Figure 1:
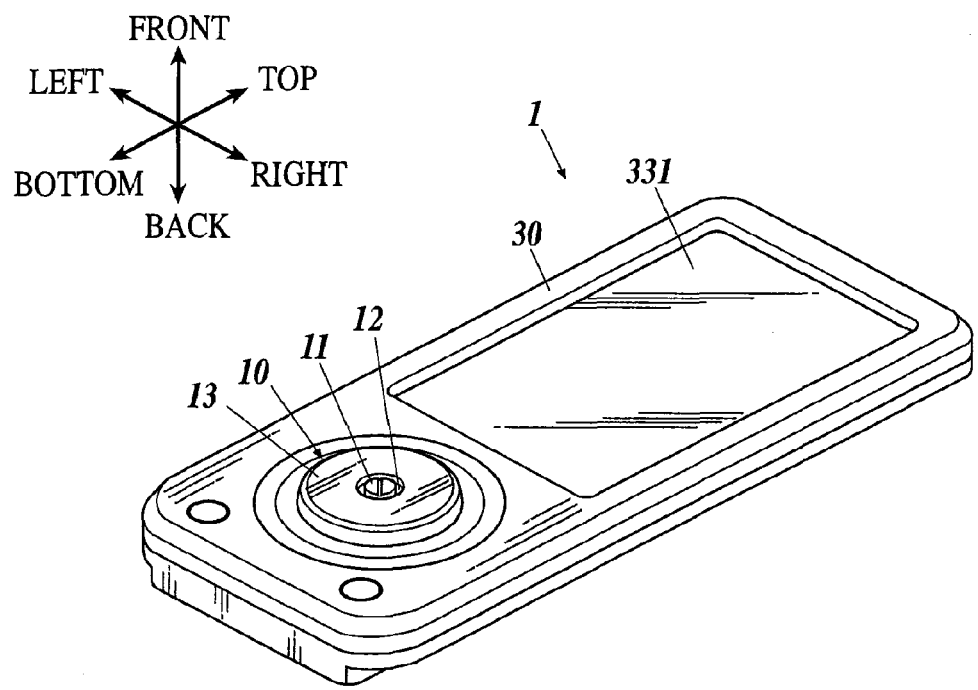
FIG. 1 is a perspective view of a cellular phone handset equipped with a rotary input device of an embodiment to which the present invention is applied.

In the following, an embodiment of the present invention will be described in detail by reference to the accompanying drawings. Incidentally, the scope of the present invention is not limited to the shown examples.

In the present embodiment, it is intended to describe the present embodiment by illustrating a cellular phone handset performing verbal communication by wireless communication as electronic equipment equipped with a rotary input device according to the present invention.

Incidentally, in the following description, it is supposed that the side on which a rotary input device 10 and a display panel 331 of a display section 33 are arranged is treated as the front side, and the side opposed to the side on which the rotary input device 10 and the display panel 331 are arrange is treated as the back side in a cellular phone handset 1 of the present embodiment. Then, the side on which the display panel 331 is arranged is treated as the top side; the side on which the rotary input device 10 is arranged is treated as the bottom side; and the direction perpendicular to both of the front-back direction and the top-bottom direction is treated as the left-right direction.

Moreover, various operation inputs are performed into the cellular phone handset 1 by the rotary input device 10 in the present embodiment. For example, when a rotary operation device 13 of the rotary input device 10 is operated to rotate, an image displayed on the display section 33 is scrolled according to the rotary operation. Moreover, a rotary force is applied to the rotary operation device 13 according to the rotary operation, and a force sense is presented to an operator.

Here, the "force sense" does not mean the sense of touch caused by a mere vibration, but the sense of weight weighing on a finger when the rotary operation device is rotated with the finger. To put it concretely, the "force sense" means a sense that feels the rotation light or heavy. To put it more concretely, for example, the "force sense" means the sense weighed on a finger at the time of rotating the rotary operation device 13 for 3-6 msec or by 1-5 degrees with a force of 0.05 Ncm or more.

Figure 2:
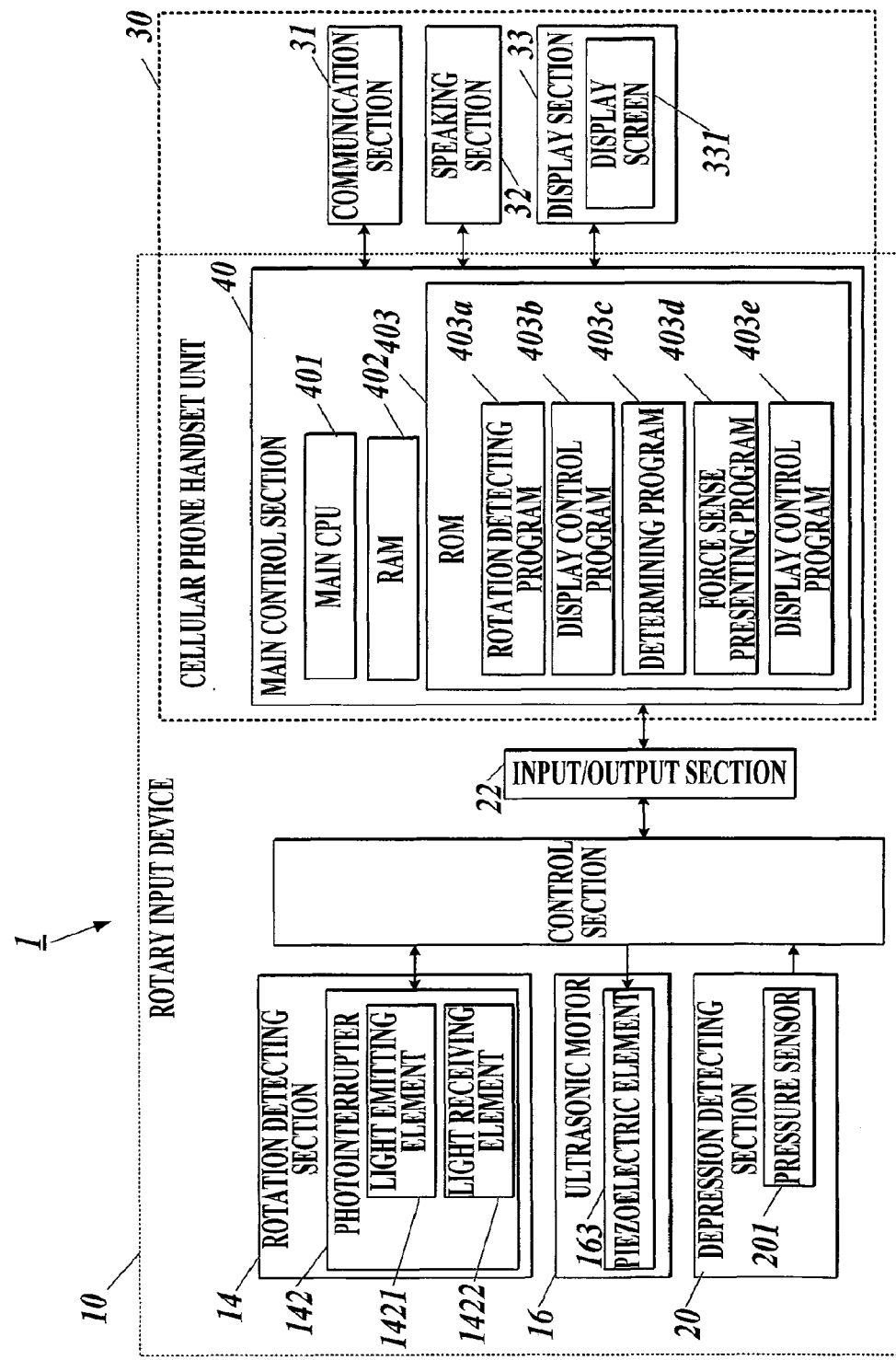
FIG. 2 is a block diagram showing the functional configuration of a cellular phone handset of the present embodiment.
Figure 3:
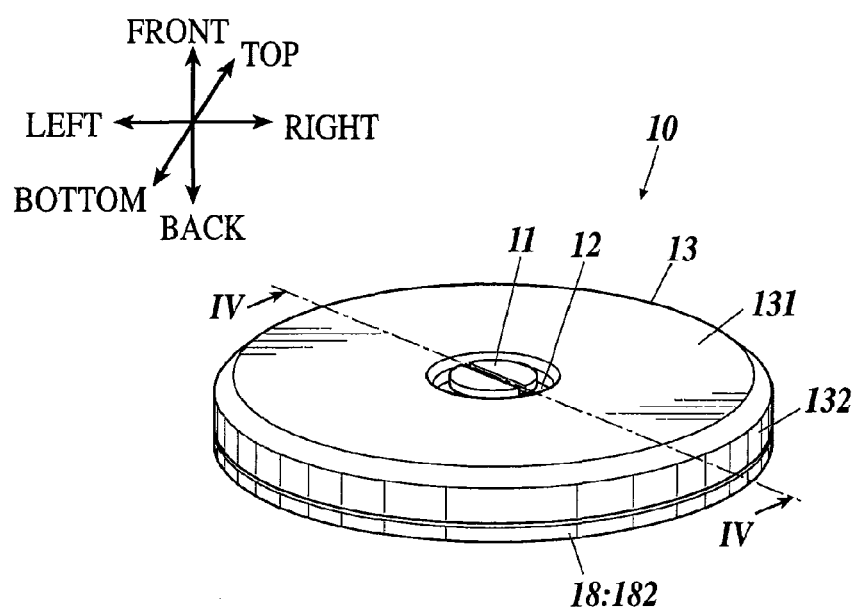
FIG. 3 is a perspective view of an external appearance of the rotary input device of the present embodiment.
Figure 4:
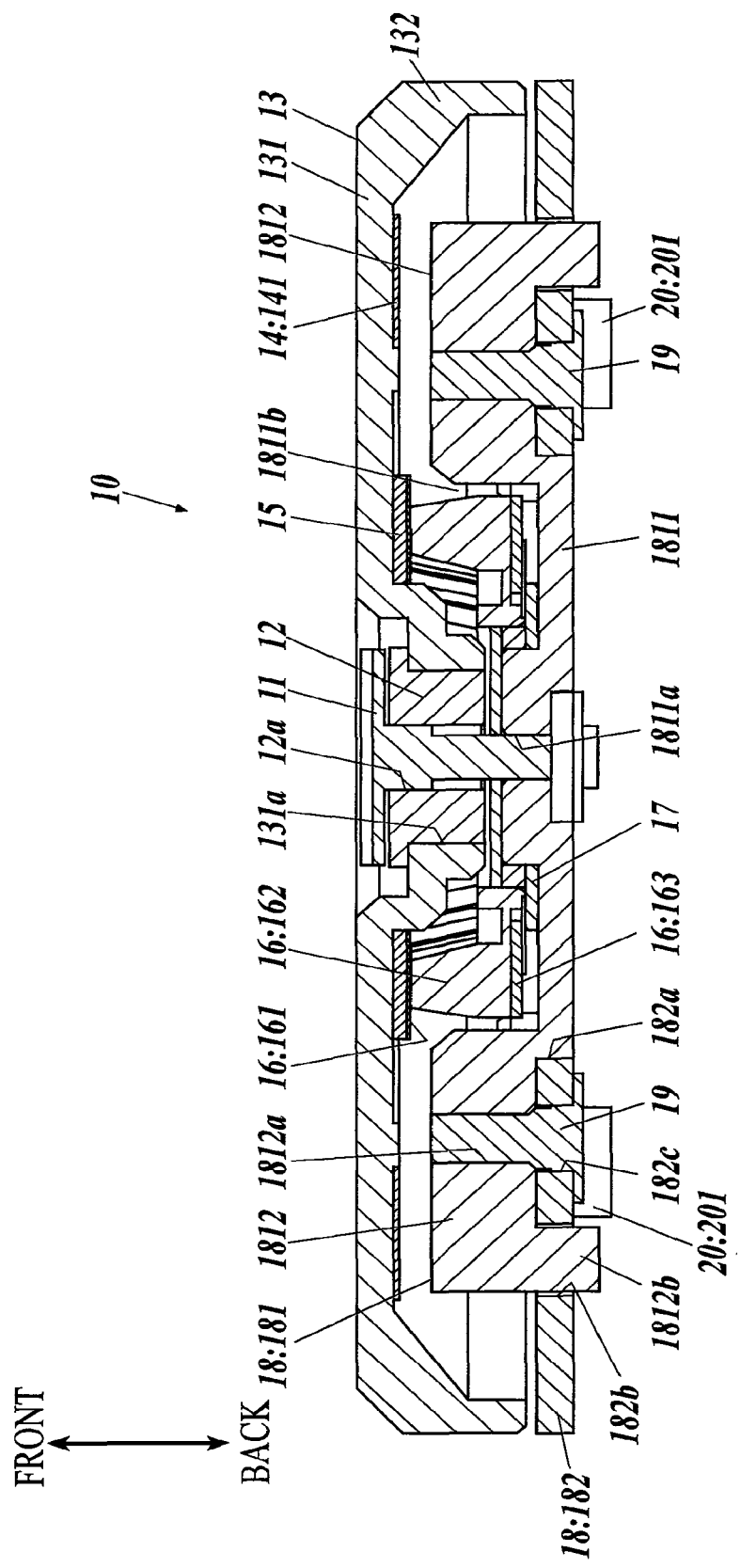
FIG. 4 is a sectional view taken along the line IV-IV of FIG. 3.

The cellular phone handset 1 is composed of, for example, the rotary input device 10 for an operator to perform an input operation, a cellular phone handset unit 30 operated by the rotary input device 10, and a main control section 40 performing the integrated control of the cellular phone handset 1 as shown in FIGS. 1 and 2.

First, the rotary input device 10 of the present embodiment will be described.

The rotary input device 10 includes, for example, the rotary operation device 13 capable of being manually operated by an operator and a supporting stand 18 provided on the back side of the rotary operation device 13 to support the rotary operation device 13 rotatably, and the whole of the rotary input device 10 forms almost a disk shape as shown in FIGS. 2-5.

The rotary operation device 13 is equipped with a circular front surface section 131 including an aperture section 131a at the center thereof, and a circumferential surface section 132 projecting from the edge portion of the front surface section 131 to the back over the whole circumference. The rotary operation device 13 is provided at a position to cover the front side of the supporting stand 18, and consequently the front surface section 131 and the circumferential surface section 132 form the front surface and the circumferential surface of the rotary input device 10, respectively.

The front surface section 131 forms the operation surface for a rotation operation by an operator, and the operator performs an input operation into the cellular phone handset unit 30 by rotating the rotary operation device 13 while pressing down a point of the front surface section 131 with a fingertip or while pinching the circumferential surface section 132.

The rotary operation device 13 may be formed of, for example, a material having a radiation performance, such as aluminum, or a material having a strong resistance property to an impact from the outside, alternatively may be formed of a resin or the like.

The supporting stand 18 is equipped with a base 181 and a polychlorinated biphenyl (PCB) substrate 182 connected to the base 181. By providing the supporting stand 18 at a position to cover an aperture on the back side of the rotary operation device 13, the supporting stand 18 forms the back surface of the rotary input device 10.

The base 181 is equipped with an almost doughnut disk-like pedestal section 1811 having an aperture at the center thereof and four extension sections 1812 extending toward the outside from the peripheral portion of the pedestal section 1811.

Each of the extension sections 1812 is provided with a threaded hole 1812a for attaching a screw and a projection 1812b formed on the back surface further outward than the threaded hole 1812a to extend toward the rear.

The base 181 is made of a material, such as polycarbonate.

The PCB substrate 182 is formed in a tabular ring having almost the same outer diameter as that of the rotary operation device 13, and the pedestal section 1811 of the base 181 is fit into an aperture section 182a at almost the center of the PCB substrate 182. Moreover, the PCB substrate 182 is provided with four attaching holes 182b for attaching the projections 1812b provided on the back surface of each of the extension sections 1812 of the base 181 to project backward are formed in the PCB substrate 182 correspondingly to the projections 1812b, respectively. Then, the PCB substrate 182 and the base 181 are integrally connected to each other by attaching the pedestal section 1811 of the base 181 to the aperture section 182a of the PCB substrate 182, and by fitting the projections 1812b of the base 181 into the attaching holes 182b of the PCB substrate 182, respectively.

Moreover, four hole sections 182c, each having a diameter slightly larger than that of each of the threaded holes 1812a of the base 181, are formed in the PCB substrate 182 at positions overlapping the threaded holes 1812a, respectively, correspondingly to the threaded holes 1812a, respectively. A screw 19 is screwed from the back side of the PCB substrate 182 into each of the threaded holes 1812a of the base 181 through each of the hole sections 182c of the PCB substrate 182, and thereby the PCB substrate 182 and the base 181 are fixed to each other.

On the back side of the PCB substrate 182, a depression detecting section 20 to detect a pressure in an axial direction (front-back direction) to the rotary operation device 13 is provided.

Furthermore, a bearing 12 is provided to be arranged on the inner circumferential surface of the aperture section 131a of the front surface section 131 with which the rotary operation device 13 is equipped, a screw 11 to function as a rotation shaft of the rotary operation device 13 is inserted into a through-hole 12a at the center of the bearing 12. Then, the screw 11 and the supporting stand 18 are fix to each other by inserting the screw 11 into the through-hole 12a of the bearing 12 from the front side of the rotary operation device 13 and further by screwing the back end part of the screw 11 projecting backward into the female screw formed on the inner circumferential surface of the aperture 1811a at the center of the pedestal section 1811 with which the base 181 is equipped. Hereby, the rotary operation device 13 is connected to the supporting stand 18 rotatably around the screw 11.

Moreover, a space is formed between the rotary operation device 13 and the supporting stand 18, and the space is provided with arranged components of: a rotation detecting section 14 detecting a rotation position (rotation angle) of the rotary operation device 13, an ultrasonic motor 16 as a rotation driving section to apply a rotary force to the rotary operation device 13, a control section 21 performing the integrated control of the rotary input device 10, an input/output section 22 performing the transmission and reception of various signals with the main control section 40, and the like.

The rotation detecting section 14 is composed of, for example, a ring-like code wheel 141 and a photointerrupter 142 detecting the rotation angle displacement of the code wheel 141.

The code wheel 141 is fixated onto the inner surface (back surface) of the front surface section 131 of the rotary operation device 13 in the state in which the center of the code wheel 141 agrees with the center of the rotary operation device 13, and the code wheel 141 rotates in conjunction with the rotary operation device 13. A light reflecting surface is printed on the back surface of the code wheel 141 at a predetermined pitch of two detection patterns of an A phase and a B phase along a circumferential direction.

The photointerrupter 142 is a reflection type photointerrupter composed of a light emitting element 1421, such as a light emitting diode (LED), and a light receiving element 1422, such as a photo integrated circuit (IC). The photointerrupter 142 is mounted at a position opposed to the code wheel 141 on the front surface of the PCB substrate 182, and is connected to the control section 21.

The light receiving element 1422 includes at least two light receiving surfaces and is configured to output the detection signals of the A phase and the B phase, which differs from each other by 90 degrees.

The photointerrupter 142 receives the reflection light of a light emitted from the light emitting element 1421 toward the code wheel 141 with the light receiving element 1422, and counts the reflection light. Thereby, the photointerrupter 142 detects the rotation quantity and the rotation direction of the rotary operation device 13, and outputs the detection results to the control section 21. The control section 21 outputs the detection results from the photointerrupter 142 to the main control section 40 through the input/output section 22, and then the main control section 40 specifies the rotation angle of the rotary operation device 13 on the basis of the detection results.

The ultrasonic motor 16 is composed of, for example, a piezoelectric element 163, a ring-like stator (vibrating body) 162 and a rotor 161 touching the front surface of the stator 162. The ultrasonic motor 16 drives the rotary operation device 13 in accordance with a control signal from the control section 21 to rotate the rotary operation device 13 around the shaft thereof.

The stator 162 is fit into a ring-like concave portion 1811b formed on the front surface of the pedestal section 1811 with which the base 181 is equipped, and is fixed to the base 181 with a tabular ring-like double-coated adhesive tape 17.

The stator 162 is equipped with a plurality of convex parts provided to be arranged along the circumferential direction of the stator 162 at the front part thereof, and the stator 162 is equipped with the plurality of piezoelectric elements 163, which generates vibrational energy in response to an application of a drive voltage based on a drive signal and is arranged along the circumferential direction of the stator 162 on the back surface thereof.

The rotor 161 is made of a material, such as high-molecular polyethylene, and has a tabular ring-like shape.

The rotor 161 is provided to be arranged at a position sandwiched between the stator 162 and the rotary operation device 13 on the inner circumference side of the code wheel 141, and is fixed to the rotary operation device 13 with a tabular ring-like double-coated adhesive tape 15 in the state of being arranged so that the center of the rotor 161 agrees with are the center of the rotary operation device 13. The rotor 161 rotates in conjunction with the rotary operation device 13. That is, the front surface of the rotor 161 is adhered to the back surface of the double-coated adhesive tape 15 adhered on the back surface of the front surface section 131, with which the rotary operation device 13 is equipped, and the back surface of the rotor 161 is touched to the convex parts of the stator 162. The back surface of the rotor 161 is made to have a high friction coefficient, and is configured to rotate in the counter direction to the direction of a progressive wave produced by a vibration of the stator 162 touched to the back surface.

The piezoelectric element 163 is connected to the control section 21. When a predetermined drive voltage is applied from the control section 21 to the piezoelectric element 163, the whole body of the stator 162 is vibrated by an ultrasonic vibration of the piezoelectric element 163, and the progressive wave is transmitted to the rotor 161. By this, the rotor 161 rotates. Then, the rotary input device 10 is configured to rotate the rotary operation device 13 by the transmission of the rotary force of the rotor 161 to the rotary operation device 13. Furthermore, the rotary input device 10 is configured to be able to freely set the magnitude and the rotation direction of the rotary force of the rotary operation device 13 caused by the ultrasonic vibration of the piezoelectric element 163 by controlling the drive frequency of the drive voltage applied to the piezoelectric element 163.

The depression detecting section 20 is equipped with four pressure sensors 201 fixated at four positions on the top side, the bottom side, the left side, and right side on the back surface of the PCB substrate 182, and is connected to the control section 21. The four pressure sensors 201 are arranged around the axis of the rotary operation device 13 at regular intervals.

The depression detecting section 20 detects a depression of the rotary operation device 13 in the axial direction (front-back direction) thereof with each of the pressure sensors 201 to output the detection results to the control section 21.

The control section 21 outputs the detection results from the depression detecting section 20 to the main control section 40 through the input/output section 22. Then, the main control section 40 specifies the depressed position of the rotary operation device 13 and calculates the depression force at the depressed position of the rotary operation device 13 on the basis of the detection results.

Incidentally, as the pressure sensors 201, for example, a resistive film type pressure sensor, a diffusion type one, a film formation type one, an electrical capacitance type one, and a mechanical type one can be used.

Moreover, although the configuration equipped with the four pressure sensors 201 is described in the present embodiment, the number of the pressure sensors 201 is not limited to four, but the number is arbitrary as long as the number is three or more.

Moreover, the rotary operation device 13, the code wheel 141, and the rotor 161 described above are provided to be arranged at the positions where the central axes of rotation of them are the same axis, and are configured to rotate around the screw 11 fixed on the supporting stand 18 to be the rotation axis.

The control section 21 is composed of, for example, a central processing unit (CPU), a random access memory (RAM), and a read only memory (ROM) (all not shown).

The control section 21 is connected to the main control section 40 through the input/output section 22. The control section 21 outputs the signals input from each section constituting the rotary input device 10 to the main control section 40 and performs the centralized control of the operation of each section constituting the rotary input device 10 in accordance with a control signal input from the main control section 40.

To put it concretely, the control section 21 is connected to the photointerrupter 142 of the rotation detecting section 14. The control section 21 instructs the light emitting element 1421 of the photointerrupter 142 to emit a light in accordance with a control signal input from the main control section 40 through the input/output section 22, and outputs a detection signal, input from the light receiving element 1422 of the photointerrupter 142, as a detection result to the main control section 40 through the input/output section 22. Hereby, the main control signal 40 specifies a rotation angle of the rotary operation device 13.

Moreover, the control section 21 is connected to the ultrasonic motor 16, and outputs a predetermined drive signal to the piezoelectric element 163 of the ultrasonic motor 16 in accordance with a control signal input from the main control section 40 through the input/output section 22. Hereby, the rotary operation device 13 rotates around the axis thereof.

Moreover, the control section 21 is connected to the depression detecting section 20, and outputs a detection signal as a detection result input from the depression detecting section 20 to the main control section 40 through the input/output section 22. Hereby, the main control section 40 specifies the depressed position of the rotary operation device 13 and the depression force at the time of the depression of the rotary operation device 13.

The input/output section 22 is connected to the main control section 40. The input/output section 22 outputs a signal input from each section constituting the rotary input device 10 to the main control section 40, and on the other hand, outputs a control signal input from the main control section 40 to the control section 21.

To put it concretely, the input/output section 22 transmits a signal showing a rotation angle, or a rotation position of the rotary operation device detected by the control section 21, to the side of the cellular phone handset unit 30 on the basis of the rotation quantity and the rotation direction, both output from the rotation detecting section 14. Moreover, the input/output section 22 transmits a signal showing the depression force and the depressed position in a rotary operation of the rotary operation device 13, detected by the control section 21, to the side of the cellular phone handset unit 30 on the basis of the detection values output from the four pressure sensors 201 provided to be arranged on the back side of the PCB substrate 182.

Incidentally, the rotary input device 10 may be configured so that the signals output from the rotation detecting section 14 and each of the pressure sensors 201 may be transmitted to the side of the cellular phone handset unit 30 in the forms of analog signals without being subjected to any analog-to-digital (A/D) conversion.

Next, the cellular phone handset unit 30 according to the present embodiment will be described.

The cellular phone handset unit 30 is composed of, for example, as shown in FIG. 2, a communication section 31, which is equipped with an antenna (not shown) to perform the transmission and reception of wireless signals with external equipment, a speaking section 32, with which an operator performs telephonic communication with a third person, the display section 33, which makes a display screen 331 display various screens thereon, and the main control section 40 performing the integrated control of the whole cellular phone handset 1.

Incidentally, because publicly known techniques are used for the communication section 31 and the speaking section 32 for realizing a verbal communication function with external equipment by using wireless signals, the detailed descriptions of the communication section 31 and the speaking section 32 are omitted.

The display section 33 is composed of, for example, the display screen 331, such as a liquid crystal display (LCD), and makes the display screen 331 display various image S thereon in accordance with instructions input from the main control section 40.

The image S displayed on the display screen 331 are scrolled or selected to be switched in accordance with rotary operations of the rotary operation device 13 by an operator.

FIGS. 6A and 6B are views for describing the movements of an image displayed on the display screen 331.

In FIGS. 6A and 6B, it is supposed that an image S under display on the display screen 331 is scrolled rightward by a rotary operation of a clockwise rotation, and that the image S is scrolled leftward by a rotary operation of a counterclockwise rotation. Incidentally, the edges on the left side and the right side of the image S under display are denoted by S1 and S2, respectively.

As shown in FIG. 6A, for example, if an operator performs a rotary operation of the rotary operation device 13 in the clockwise direction in the state in which the image S is displayed at the central part of the display screen 331, then the image S scrolls rightward according to the rotary operation. After that, as shown in FIG. 6B, when the edge (end part of range) S1 of the image S reaches the edge of the display screen 331, the image S does not scroll any more at that time point.

At this time, a rotation force in the counterclockwise direction is applied to the rotary operation device 13 by the ultrasonic motor 16, and the rotary operation device 13 is configured not to rotate any more. The rotation angle of the rotary operation device 13 at the time point when the rotary operation device 13 does not rotate any more (the time point when the rotary operation device 13 does not scroll any more) is called as a critical angle. Then, if the operator releases the finger from the operation position at the time point when the rotation angle of the rotary operation device 13 reaches the critical angle, the rotary operation device 13 reversely rotates to return to the initial position, and also the image S returns to the initial position (before the movement) corresponding to the initial position of the rotary operation device 13 in conjunction with the reversing of the rotary operation device 13.

Incidentally, the rotation angle of the rotary operation device 13 and the movement distance of the image S according to the rotation angle can previously be set, for example, the image S moves by 0.5 cm every rotation angle of 10° of the rotary operation device 13.

Moreover, the positions of the end parts of a range can arbitrarily be set, and, for example, the end part of a range at the time of rightward scrolling may be set as the edge S2 of the image S on the right side thereof. In this case, when the edge S2 of the image S reaches the edge of the display screen 331, the image S does not scroll any more at the time point.

Moreover, it is also possible to configure the rotary input device 10, in which a predetermined reference position is previously set in place of the initial position, to return the rotary operation device 13 to the reference position when the rotary operation described above is performed. At this time, the image S is led to be returned to the position corresponding to the reference position.

To put it concretely, if, as the reference position, for example, the position where the position of the edge S2 of the image S overlaps with the right edge of the display screen when the image S is scrolled rightward is set as the end part of the range, then the image S returns to this position when the operator releases the finger from the operation position at the time point when the rotation angle of the rotary operation device 13 reaches the critical angle.

Moreover, as shown in FIGS. 7A and 7B, if thumbnail screens arranged in a matrix on the display screen 331 are displayed, for example, the image at a lower right position can be set as the end part of the range. That is, a selected image is sequentially switched according to a rotary operation from the image on the left side in a first row in the order of the following positions: the center in the first row, the right, the left in a second row, the center, the right, the left in a third row, the center, and the right. At the time point when the image on the right side in the third row is selected, the position is set as the end part of the range, and the image does not scroll any more. Then, when the operator releases the finger from the operation position of the rotary operation device 13, the rotary operation device 13 returns to the initial position, and also the selected image returns to the initial left side in the first row.

Incidentally, also in the example mentioned above, the rotation angle for moving one image can suitably be set. For example, if one image is set to move every rotation angle of 20°, 160° is the critical angle.

The main control section 40 is composed of a main CPU 401, a RAM 402, a ROM 403, and the like, and is connected to the control section 21 of the rotary input device 10. The main control section 40 controls each section of the cellular phone handset unit 30 on the basis of input operation signals transmitted from the rotary input device 10.

The main CPU 401 reads out processing programs and the like stored in the ROM 403 to expand the read-out processing programs into the RAM 402 and execute the expanded processing programs in accordance with input signals input from each section of the cellular phone handset unit 30 and the rotary input device 10, and then the main CPU 401 controls the whole rotary input device 10 by outputting control signals to each section thereof.

The RAM 402 is equipped with a program storing region for expanding various programs to be executed by the main CPU 401, and a data storing region for storing input data and processing results produced at the time of the execution of the processing programs. The RAM 402 is used as a work area of the main CPU 401.

The ROM 403 stores the processing programs, data, and the like in advance, and stores, for example, a rotation detecting program 403*a*, a display controlling program 403*b*, a judging program 403*c*, a force sense presenting program 403*d*, and a rotation controlling program 403*e*.

The rotation detecting program 403*a* is, for example, a program for enabling the main CPU 401 to realize the function of detecting the rotation angle of the rotary operation device 13.

To put it concretely, the main CPU 401 executes the rotation detecting program 403*a* to detect the rotation quantity and the rotation direction of the rotary operation device 13 with the photointerrupter 142 when an operator performs a rotary operation to the rotary operation device 13. The main CPU 401 specifies the rotation angle of the rotary operation device 13 on the basis of the detection results.

The main CPU 401 functions as a rotation detecting section together with the rotation detecting section 14 by executing the rotation detecting program 403*a*.

The display controlling program 403*b* is, for example, a program for enabling the main CPU 401 to realize the function of scrolling the image under display in the display section 33 by the rotation of the rotary operation device 13.

To put it concretely, when the rotation angle of the rotary operation device 13 is detected by the execution of the rotation detecting program 403*a*, the main CPU 401 executes the display controlling program 403*b* to scroll the image under display in the display section 33 by the movement distance according to the detected rotation angle. Here, if the rotation operation device 13 is rotated in the clockwise direction, the image is scrolled rightward. If the rotary operation device 13 is rotated in the counterclockwise direction, the image is scrolled leftward.

Incidentally, the rotation angle and the movement distance (scrolling quantity) of an image are previously determined to be stored in the ROM 403.

Moreover, if the rotary operation device 13 is reversely rotated to the initial position or the reference position by the execution of the rotation controlling program 403*e*, the main CPU 401 executes the display controlling program 403*b*, and thereby shifts the display position of the image displayed in the display section 33 to the position corresponding to the initial position or the reference position.

The main CPU 401 functions as a display control section by executing the display controlling program 403*b*.

The judging program 403*c* is, for example, a program for enabling the main CPU 401 to realize the function of judging whether the rotation angle of the rotary operation device 13 reaches the critical angle corresponding to the end part of a range of the image displayed in the display section 33 or not.

To put it concretely, if the rotation angle of the rotary operation device 13 is detected by the execution of the rotation detection program 403*a*, the main CPU 401 executes the judging program 403*c* to calculate the movement distance of the image corresponding to the detected rotation angle, and compares the calculated movement distance and the movement distance corresponding to the critical angle to judge whether the rotation angle reaches the critical angle or not.

The main CPU 401 functions as a judging section by executing the judging program 403*c*.

The force sense presenting program 403*d* is, for example, a program for enabling the main CPU 401 to realize the function of presenting a force sense to an operator by applying a loaded rotary force to the rotary operation device 13 according to the rotation angle of the rotary operation device 13.

To put it concretely, if the rotation angle of the rotary operation device 13 is detected by the execution of the rotation detecting program 403*a*, the main CPU 401 executes the force sense presenting program 403*d*, and thereby applies a loaded rotary force to the rotary operation device 13 according to the rotation angle by the ultrasonic motor 16. The loaded rotary force is set to be larger as the rotation angle becomes larger. Consequently, an operator obtains a larger force sense as the operator rotates the rotary operation device 13 greatly. That is, as the operator rotates the rotary operation device 13 more and more, the operating feeling thereof becomes heavier.

Incidentally, the rotation angles and the magnitudes of the loaded rotary forces are previously associated with each other, and are stored in the ROM 403.

In the following, the loaded rotary force to be applied at the time when the rotation angle of the rotary operation device 13 is the critical angle will be referred to as "maximum force sense."

Moreover, if the main CPU 401 judges that the rotation angle of the rotary operation device 13 reaches the critical angle by the execution of the judging program 403c, the main CPU 401 executes the force sense presenting program 403d to apply rotary forces in the forward direction and the backward direction periodically to the rotary operation device 13.

That is, when the rotation angle of the rotary operation device 13 reaches the critical angle and an operator does not release the finger from the rotary operation device 13 (when the pressure of the maximum force sense or more is added in the forward direction), then the main CPU 401 applies a rotary force alternately in the forward direction and the backward direction to the rotary operation device 13 at a predetermined period.

Consequently, an operator obtains a larger force sense as the operator rotates the rotary operation device 13 largely. If the operator tries to continue the rotary operation in the same direction as that until then after the operator has obtained the maximum force sense, the operator is led to obtain the rotary force to be alternately applied in the forward direction and the backward direction.

The main CPU 401 functions as a force sense presenting section by executing the force sense presenting program 403d.

The rotation controlling program 403e is, for example, a program for enabling the main CPU 401 to realize the function of reversing the rotary operation device 13 to the initial position or the reference position when the rotation angle of the rotary operation device 13 is judged to has reached the critical angle by the execution of the judging program 403c and the rotary operation of an operator to the rotary operation device 13 is released.

To put it concretely, if the main CPU 401 judges that the rotation angle of the rotary operation device 13 has reached the critical angle by the execution of the judging program 403c, the main CPU 401 executes the rotation controlling program 403e to judge whether the pressure in the forward direction in a rotary operation of an operator is smaller than the maximum force sense or not. If the pressure in the forward direction in the rotary operation of the operator is smaller than the maximum force sense, then the main CPU 401 controls the ultrasonic motor 16 so that the force sense given at the initial position or the reference position may disappear.

That is, if the pressure in the forward direction in the rotary operation of the operator is smaller than the maximum force sense, the rotary operation device 13 is led to reversely rotate by a given force sense. Then, the force sense given at the previously set initial position or the reference position disappears, and consequently the rotation of the rotary operation device 13 is led to stop. Then, in this case, the display controlling program 403b is executed, and the image under display is displayed at a position corresponding to the initial position or the reference position.

On the other hand, if the pressure in the forward direction in the rotary operation by the operator is equal to or more than the maximum force sense, then the rotary operation device 13 is led to stop at that position. Then, in this case, the rotary operation of the operator to the rotary operation device 13 is regarded as not being released, and the force sense presenting program 403d is executed. Then, the rotary forces in the forward direction and the backward direction are periodically applied to the rotary operation device 13.

Incidentally, the initial position and the reference position of the rotary operation device 13 are arbitrarily set by an operator, and are stored into the ROM 403 in advance.

The main CPU 401 functions as a rotation controlling section by executing the rotation controlling program 403e.

Incidentally, the rotary input device 10 of the present embodiment is composed of the rotation detecting section 14, the ultrasonic motor 16, the depression detecting section 20, the control section 21, the input/output section 22, and the main control section 40.

Figure 8:
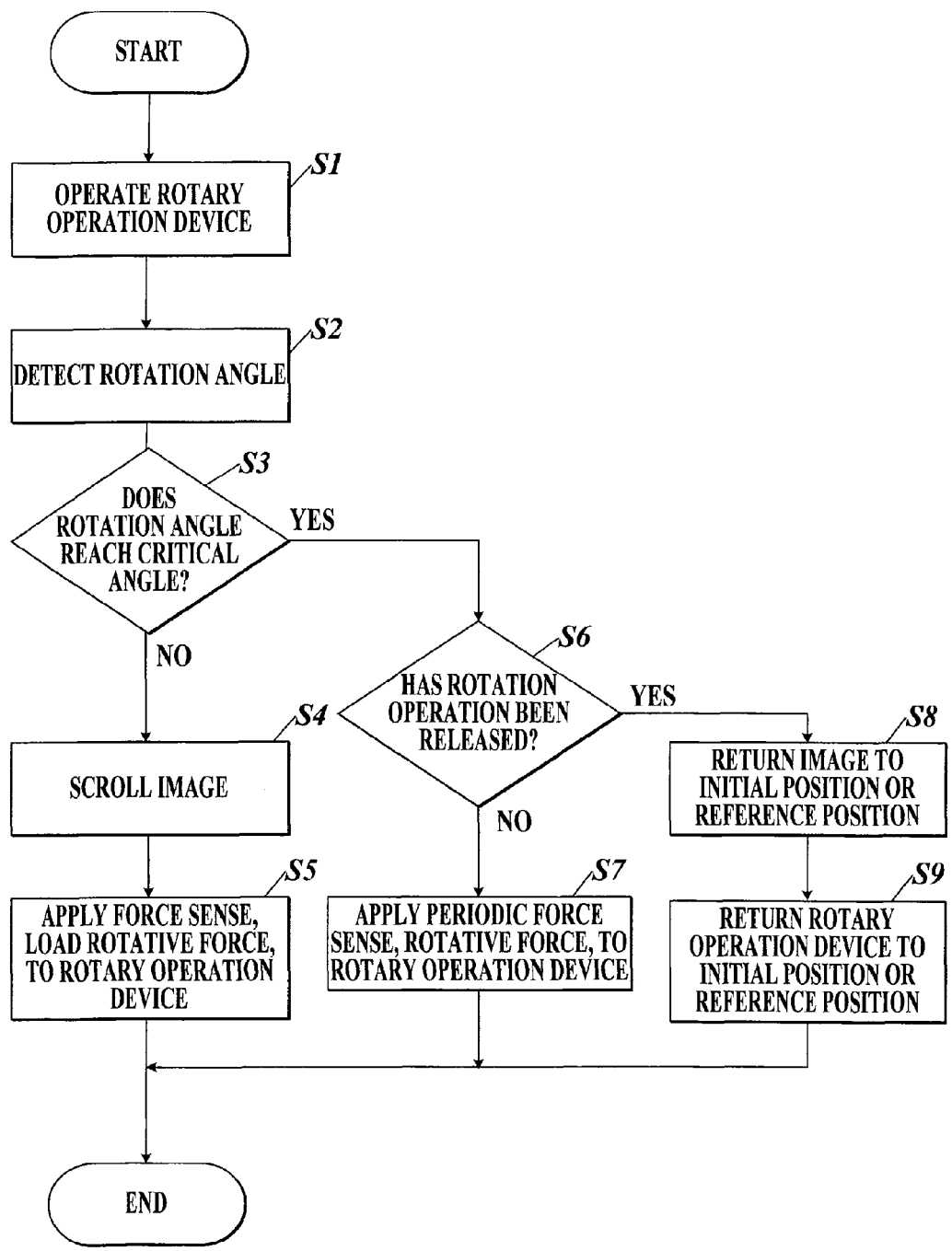
FIG. 8 is a flow chart showing rotation control processing and display controlling processing executed in the cellular phone handset of the present embodiment.

Next, the rotation control processing and the display controlling processing of the cellular phone handset 1 (rotary input device 10) of the present embodiment are described by using the flow chart of FIG. 8.

First, when an operator performs an operation of the rotary operation device 13 at Step S1, the main control section 40 detects the rotation angle of the rotary operation device 13 in this operate at Step S2.

Next, the main control section 40 judges whether the rotation angle detected at Step S2 reaches the critical angle or not at Step S3.

Then, if the rotation angle does not reach the critical angle (Step S3; NO), the main control section 40 scrolls the image under display in the display section 33 by a distance corresponding to the rotation angle at the successive Step S4, and gives a force sense (loaded rotary force) to the rotary operation device 13 according to the rotation angle at the successive Step S5. Then the main control section 40 ends the present processing.

On the other hand, if the main control section 40 judges that the rotation angle reaches the critical angle at Step S3 (Step S3; YES), then the main control section 40 judges whether the pressure in the forward direction in the rotary operation of the operator is smaller than the maximum force sense or not, that is, whether the rotary operation to the rotary operation device 13 by the operator is released or not at successive Step S6.

Then, if the rotary operation is not released (Step S6; NO), the main control section 40 gives the rotary operation device 13 periodic force senses (forward direction rotary force and backward direction rotary force) at successive Step S7, and ends the present processing.

On the other hand, if the rotary operation is released at Step S6 (Step S6; YES), then the main control section 40 returns the image under display on the display section 33 to the initial position or the reference position at successive Step S8, and returns the rotary operation device 13 to the initial position or the reference position at successive Step S9 to end the present processing.

As described above, according to the present embodiment, when the rotation angle of the rotary operation device 13 is judged to reach the critical angle (when an image displayed in the display section 33 judged to reach the end part of a range) and when a rotary operation of an operator to the rotary operation device 13 is released, then the rotary operation device 13 and the image under display return to the initial position or the reference position. Consequently, when the image reaches the end of a range by the rotary operation, the operator can perceive the reaching sensibly, and the rotary operation device 13 and the display section 33 can be returned to an arbitrary position in conjunction with each other, and the usability of the rotary operation device 13 is improved.

Moreover, because a loaded rotary force having a magnitude according to the rotation angle of the rotary operation device 13 is applied to the rotary operation device 13, the rotation angle can be realized as a sense.

Moreover, if the rotation angle of the rotary operation device 13 is judged to reach the critical angle, rotary forces in the forward direction and the backward direction are periodically applied to the rotary operation device 13, and then an operator can perceive sensibly the reaching to the end of a range during the rotary operation.

Moreover, because the presentation of a force sense can be performed without burying the rotary operation device 13 in the front-back direction, the thinning of the device can be realized.

Incidentally, although the embodiment described above is configured to give a force sense according to the rotation angle of the rotary operation device 13, it is also possible to take the configuration of not giving any force senses.

In that case, when the main CPU 401 judges that the rotation angle of the rotary operation device 13 reaches the critical angle by the execution of the judging program 403c, then the main CPU 401 executes the rotation controlling program 403e to judge whether the pressure in the forward direction in a rotary operation by an operator is equal to or less than a predetermined value or not. If the pressure is equal to or less than the predetermined value, the main CPU 401 controls the ultrasonic motor 16 to reversely rotate the rotary operation device 13 and stop at the initial position or the reference position.

The "predetermined value" at this time may be set in advance to be stored in the ROM 403 or the like.

Incidentally, the scope of the present invention is not limited to the embodiment described above, but various improvements and changes of design may be performed without departing the spirit and scope of the present invention.

For example, although the cellular phone handset has been illustrated as the electronic equipment equipped with the rotary input device according to the present invention in the embodiment described above, the rotary input device of the present invention is not limited to the cellular phone handset, but the present invention can applied to any electronic equipment as long as the electronic equipment can perform an input operation by the rotary input device. The rotary input device of the present invention may be applied to, for example, the other portable terminal devices, such as a portable audio player and a personal digital assistance (PDA), audio visual (AV) equipment, such as a television receiver, and a personal computer. Moreover, the rotary input device may previously be incorporated in electronic equipment, or may be used by being connected to electronic equipment as an external device as a single body.

Moreover, although the optical rotation detecting section 14 composed of the toric code wheel 141 and the photointerrupter 142 has been illustrated as the rotation detection section detecting the rotation angle of the rotary operation device 13 in the embodiment described above, the rotation detecting section 14 is an example of the rotation detection section, and any configuration may be used as long as the configuration can detect the rotation angle of the rotary operation device 13. For example, a mechanical type (contact type) rotation detecting section, a magnetic type one, an electrostatic type one performing position detection by means of an electrostatic capacity change of an electrode, and the like can be used.

Furthermore, an absolute type rotary encoder capable of detecting an absolute position may be used in addition to the detection of the rotation quantity and the rotation direction of the rotary operation device 13.

Moreover, although the ultrasonic motor 16 has been illustrated as the rotation driving section to perform the rotation driving of the rotary operation device 13 in the embodiment described above, the ultrasonic motor 16 is an example of the rotation driving section, and any configuration can be used as long as the configuration can perform the rotation driving of the rotary operation device 13. For example, a static actuator performing driving by using the mutual absorption and repellence of electrostatic charges as motive power, an electromagnetic actuator performing driving by using a force caused by mutual interaction between a magnetic field and electric power, a magnetostrictive actuator, a hydraulic cylinder, a pneumatic cylinder, and the like can be used. Moreover, the drive control of the rotation driving section may be the control of transmitting the motive power of an actuator to a driven body, such as the rotary operation device 13, as it is, or may be a stepping motor operating in proportion to a drive pulse number. Moreover, an actuator performing driving by rotating a driven body may be used, or a linear actuator performing the driving by linearly moving a driven body may be used.

According to the embodiment, there is provided a rotary input device, including: a rotary operation device rotatable around an axis by receiving a rotary operation of an operator; a rotation detecting section to detect a rotation angle of the rotary operation device; a rotation driving section to apply a rotary force to the rotary operation device; a display control section to scroll an image under display on a display section by rotation of the rotary operation device; a judging section to judge whether the rotation angle of the rotary operation device detected by the rotation detecting section reaches a critical angle corresponding to an end part of a range of the image displayed on the display section or not; and a rotation controlling section to reversely rotate the rotary operation device to an initial position or a reference position when the judging section judges that the rotation angle of the rotary operation device reaches the critical angle and the rotary operation of the operator to the rotary operation device is released, wherein the display control section displays the image displayed on the display section at a display position corresponding to the initial position or the reference position when the rotary operation device is reversely rotated to the initial position or the reference position by the rotation controlling section.

Preferably, the rotary input device further includes: a force sense presenting section to present a force sense to the operator operating the rotary operation device by applying a loaded rotary force to the rotary operation device by the rotation driving section according to the rotation angle of the rotary operation device detected by the rotation detecting section.

Preferably, the force sense presenting section informs the operator of impossibility of further rotation by applying rotary forces in a forward direction and a backward direction periodically to the rotary operation device by the rotation driving section when the judging section judges that the rotation angle of the rotary operation device reaches the critical angle.

There is also provided a rotary input device, including: a rotary operation device rotatable around an axis by receiving a rotary operation of an operator; a rotation detecting section to detect a rotation angle of the rotary operation device; a rotation driving section to apply a rotary force to the rotary operation device; a display control section to scroll an image under display on a display section by rotation of the rotary operation device; a judging section to judge whether the rotation angle of the rotary operation device detected by the rotation detecting section reaches a critical angle corresponding to an end part of a range of the image displayed on the display section or not; a force sense presenting section to present a force sense to the operator operating the rotary operation device by applying a loaded rotary force to the rotary operation device by the rotation driving section according to the rotation angle of the rotary operation device detected by the rotation detecting section; and a rotation controlling section to reversely rotate the rotary operation device to an initial position or a reference position when the judging section judges that the rotation angle of the rotary operation device reaches the critical angle and the rotary operation of the operator to the rotary operation device is released, wherein the force sense presenting section informs the operator of impossibility of further rotation by applying rotary forces in a forward direction and a backward direction periodically to the rotary operation device by the rotation driving section when the judging section judges that the rotation angle of the rotary operation device reaches the critical angle; and the display control section displays the image displayed on the display section at a display position corresponding to the initial position or the reference position when the rotary operation device is reversely rotated to the initial position or the reference position by the rotation controlling section.

Preferably, there is also provided electronic equipment, including: a rotary input device; and a display section.

According to the present invention, when the rotation angle of a rotary operation device is judge to reach a critical angle (when an image displayed in the display section reaches the end part of a range) and when a rotary operation of an operator to the rotary operation device is released, the rotary operation device and the image under display returns to an initial position or a reference position. Consequently, when the image reaches the end of the range by the rotary operation, the operator can sensibly perceive the reaching and the operation section and the display section can be returned to an arbitrary position in conjunction with each other, and the usability of the rotary input device is improved.

The entire disclosure of Japanese Patent Application No. 2009-104064 filed on Apr. 22, 2009 including description, claims, drawings, and abstract are incorporated herein by reference in its entirety.

What is claimed is:

1. A rotary input device, comprising:
   a rotary operation device rotatable around an axis by receiving a rotary operation of an operator in a first rotation direction of the rotary operation device;
   a rotation detecting section to detect a rotation angle of the rotary operation device;
   a motor to apply a rotary force to the rotary operation device;
   a first judging section to judge whether the rotation angle of the rotary operation device detected by the rotation detecting section reaches a critical angle corresponding to an end part of a range of an image displayed on a display section or not;
   a second judging section to judge, only after the first judging section judges that the rotation angle of the rotary operation device reaches a critical angle, whether the rotary operation of the operator to the rotary operation device is released;
   a rotation controlling section to control the motor to reversely rotate the rotary operation device in a second rotation direction that is a reverse direction of the first rotation direction to an initial position only when the first judging section judges that the rotation angle of the rotary operation device reaches the critical angle and the second judging section judges that the rotary operation of the operator to the rotary operation device is released; and
   a display control section to scroll the image under display on the display section by rotation of the rotary operation device, and to display the image, which is displayed on the display section, at a display position corresponding to the initial position when the rotary operation device is reversely rotated to the initial position with the motor controlled by the rotation controlling section.

2. The rotary input device according to claim 1, further comprising: a force sense presenting section to present a force sense to the operator operating the rotary operation device by applying a loaded rotary force to the rotary operation device by the motor according to the rotation angle of the rotary operation device detected by the rotation detecting section.

3. The rotary input device according to claim 2, wherein the force sense presenting section applies rotary forces in a forward direction and a backward direction periodically to the rotary operation device by the motor when the first judging section judges that the rotation angle of the rotary operation device reaches the critical angle.

4. Electronic equipment, comprising:
   a rotary input device according to claim 1; and
   a display section.

5. A rotary input device, comprising:
   a rotary operation device rotatable around an axis by receiving a rotary operation of an operator in a first rotation direction of the rotary operation device;
   a rotation detecting section to detect a rotation angle of the rotary operation device;
   a motor to apply a rotary force to the rotary operation device;
   a first judging section to judge whether the rotation angle of the rotary operation device detected by the rotation detecting section reaches a critical angle corresponding to an end part of a range of an image displayed on a display section or not;
   a second judging section to judge, only after the first judging section judges that the rotation angle of the rotary operation device reaches a critical angle, whether the rotary operation of the operator to the rotary operation device is released;
   a force sense presenting section to present a force sense to the operator operating the rotary operation device by applying a loaded rotary force to the rotary operation device by the motor according to the rotation angle of the rotary operation device detected by the rotation detecting section; and
   a rotation controlling section to control the motor to reversely rotate the rotary operation device in a second rotation direction that is a reverse direction of the first rotation direction to an initial position only when the first judging section judges that the rotation angle of the rotary operation device reaches the critical angle and the second judging section judges that the rotary operation of the operator to the rotary operation device is released; and
   a display control section to scroll the image under display on the display section by rotation of the rotary operation device, and to display the image, which is displayed on the display section, at a display position corresponding to the initial position when the rotary operation device is reversely rotated to the initial position with the motor controlled by the rotation controlling section, wherein the force sense presenting section applies rotary forces in a forward direction and a backward direction periodically to the rotary operation device by the motor when the first judging section judges that the rotation angle of the rotary operation device reaches the critical angle.

6. A rotary input device, comprising:

a rotary operation device rotatable around an axis by receiving a rotary operation of an operator in a first rotation direction of the rotary operation device;

a rotation detecting section to detect a rotation angle of the rotary operation device;

a motor to apply a rotary force to the rotary operation device;

a first judging section to judge whether the rotation angle of the rotary operation device detected by the rotation detecting section reaches a critical angle corresponding to an end part of a range of an image displayed on a display section or not;

a second judging section to judge, only after the first judging section judges that the rotation angle of the rotary operation device reaches a critical angle, whether the rotary operation of the operator to the rotary operation device is released;

a rotation controlling section to control the motor to reversely rotate the rotary operation device in a second rotation direction that is a reverse direction of the first rotation direction to a previously set reference position only when the first judging section judges that the rotation angle of the rotary operation device reaches the critical angle and the second judging section judges that the rotary operation of the operator to the rotary operation device is released; and a display control section to scroll the image under display on the display section by rotation of the rotary operation device, and to display the image, which is displayed on the display section, at a display position corresponding to the reference position when the rotary operation device is reversely rotated to the reference position with the motor controlled by the rotation controlling section.

7. Electronic equipment, comprising:
a rotary input device according to claim 6; and
a display section.

8. A rotary input device, comprising:

a rotary operation device rotatable around an axis by receiving a rotary operation of an operator in a first rotation direction of the rotary operation device;

a rotation detecting section to detect a rotation angle of the rotary operation device;

a motor to apply a rotary force to the rotary operation device;

a first judging section to judge whether the rotation angle of the rotary operation device detected by the rotation detecting section reaches a critical angle corresponding to an end part of a range of an image displayed on a display section or not;

a second judging section to judge, only after the first judging section judges that the rotation angle of the rotary operation device reaches a critical angle, whether the rotary operation of the operator to the rotary operation device is released;

a force sense presenting section to present a force sense to the operator operating the rotary operation device by applying a loaded rotary force to the rotary operation device by the motor according to the rotation angle of the rotary operation device detected by the rotation detecting section;

a rotation controlling section to control the motor to reversely rotate the rotary operation device in a second rotation direction that is a reverse direction of the first rotation direction to a previously set reference position only when the first judging section judges that the rotation angle of the rotary operation device reaches the critical angle and the second judging section judges that the rotary operation of the operator to the rotary operation device is released; and a display control section to scroll the image under display on the display section by rotation of the rotary operation device, and to display the image, which is displayed on the display section, at a display position corresponding to the reference position when the rotary operation device is reversely rotated to the reference position with the motor controlled by the rotation controlling section, wherein the force sense presenting section applies rotary forces in a forward direction and a backward direction periodically to the rotary operation device by the motor when the first judging section judges that the rotation angle of the rotary operation device reaches the critical angle.

* * * * *